United States Patent [19]
Sheets

[11] Patent Number: 5,555,274
[45] Date of Patent: Sep. 10, 1996

[54] PHANTOM DATA LINK FOR DIGITAL TRANSMISSION LINES

[75] Inventor: Laurence L. Sheets, Woodridge, Ill.

[73] Assignee: Teltrend Inc., St. Charles, Ill.

[21] Appl. No.: 844,129

[22] Filed: Mar. 2, 1992

[51] Int. Cl.⁶ .................................................. H04B 3/00
[52] U.S. Cl. ......................... 375/257; 375/211; 375/213
[58] Field of Search .................................. 375/3, 3.1, 10, 375/211, 213, 224, 257; 455/601, 16; 370/13.1, 97; 340/425; 379/22

[56] References Cited

U.S. PATENT DOCUMENTS

| | | | |
|---|---|---|---|
| 3,760,127 | 9/1973 | Camiciottoli et al. | 375/3.1 |
| 4,187,415 | 2/1980 | Boutmy et al. | 375/3.1 |
| 4,354,054 | 10/1982 | Bellisio | 375/3.1 |
| 4,425,662 | 1/1984 | Jeandot | 375/10 |
| 4,604,745 | 8/1986 | Takasaki et al. | 371/22 |
| 5,038,364 | 8/1991 | Motoori | 370/13.1 |
| 5,204,880 | 4/1993 | Wurster et al. | 375/36 |

*Primary Examiner*—Stephen Chin
*Attorney, Agent, or Firm*—Banner & Allegretti, Ltd.

[57] ABSTRACT

An out of band data link for performance monitoring information using existing telecommunications transmission facilities. The Bell telephone network includes a variety of central offices and network interface units that should communicate with each other regarding performance. The data link allows the network interface unit to advise the telephone company's central office of difficulties. A first modem is interconnected between a pair of simplex leads in the central office telephone company's central office repeater transformers, and a second modem is interconnected between a pair of simplex leads in the network interface unit's transformers. The voltage between each pair of leads is used to effect communication between the telephone company's central office and the network interface unit. Accordingly existing cables can continued to be dedicated to the transmission of payload, rather than requiring the capacity of the cables to be reduced so that the network interface unit can transmit performance data to the central office.

18 Claims, 2 Drawing Sheets

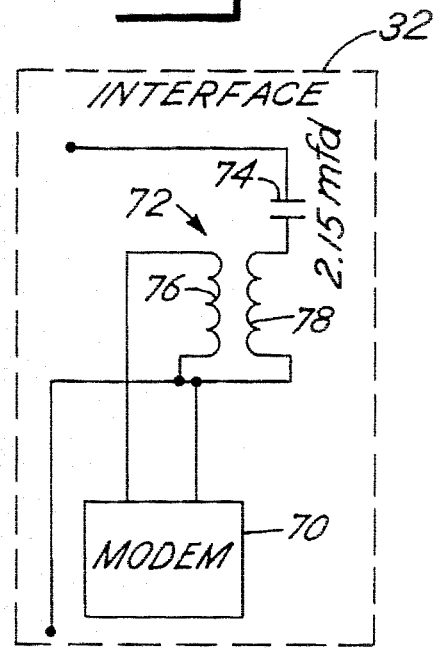
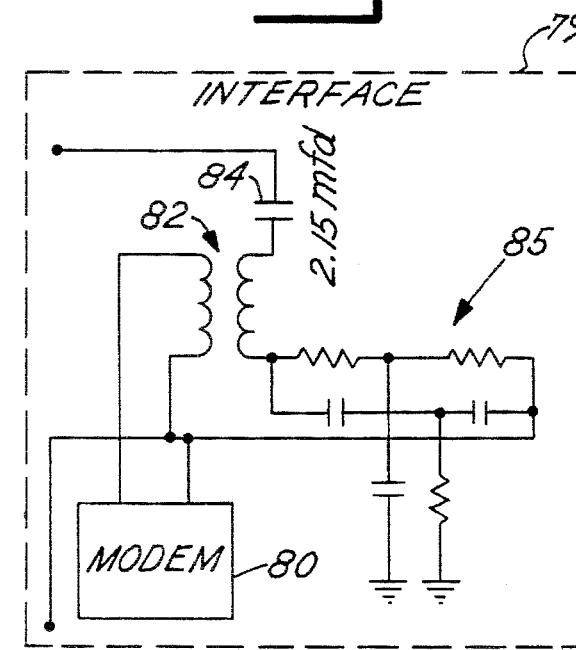
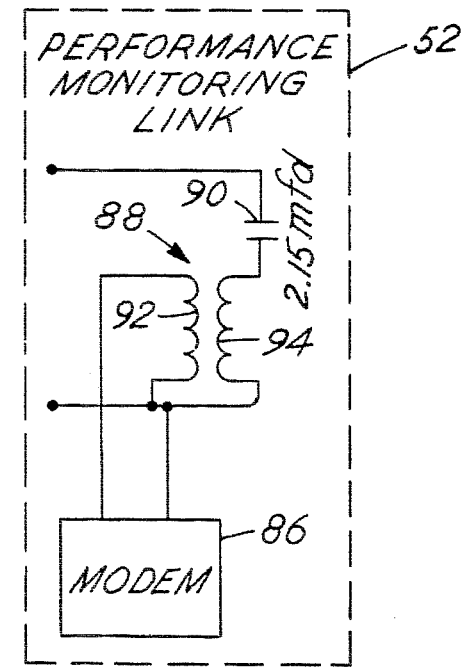

PHANTOM DATA LINK FOR DIGITAL TRANSMISSION LINES

BACKGROUND OF THE INVENTION

The present invention relates generally to data links for telecommunications transmission facilities and, more particularly, to a phantom (out of band) data link for performance monitoring information that uses existing telecommunications transmission facilities. The invention, in effect, allows a telephone company central office and a remote location to communicate with each other over existing telephone lines, without "interfering" with, or displacing, any telephone communications being sent over the lines. Accordingly, the telephone company central office can better diagnose problems that may occur at the remote locations.

The Bell telephone system in the United States, for example, has widely utilized time multiplexing, pulse code modulation systems. Such systems have been designated as "T carriers." As is well known by those of ordinary skill in the art, the first generation of multiplexers designed to feed the T1 system was the D1 channel bank. The channel banks have evolved through the D5 series. The "D" channel bank commonly provides multiple DS-1 signals that are carried on the T1 systems. Each T1 carries 24 two-way channels on two pairs of 15 exchange grade cables. One pair of cables is provided for each direction of transmission.

The data, or "payload," signals to be sent over the transmission lines are sent differentially on the Tip-Ring pair. A longitudinal, or common mode, direct current is applied to the simplex lead to power T1 line repeaters. "Payload" signals are received by the telephone company central office and are transmitted, via the cables, to a series of regenerative repeaters. Such repeaters are spaced along the cables approximately every 6,000 feet.

The information on such a pulse code modulated system is transmitted in the form of bipolar or alternate mark inversion (AMI) pulses. The first repeater receives the data from the central office repeater, but because of transmission line losses, noise, interference, and distortion, the signal will have degenerated. The repeater recognizes the presence or absence of a pulse at a particular point in time and thereafter, if appropriate, regenerates a clean, new pulse. A regenerative repeater, or "line repeater," is powered by the transmission cable itself to generate the new pulses. The new pulses are transmitted by the line repeater along more cable to either another line repeater or to a Network Interface Unit ("NIU"). The NIU, in turn, transmits signals to equipment on the customer premises.

NIUs commonly have the capability to identify errors in the data received over the cable and responsively provide a signal to the central office that the errors have occurred. Errors that can be detected by the NIU include, for example, errors in signaling, format, bipolar violations, out of frame data, or loss of signal, as well as the disconnection of equipment by the customer.

Thus, for example, a cyclic redundancy check ("CRC") may be employed to determine whether the "remainders" (determined under the CRC method) are consistent. If they are not, the NIU will have detected corrupt data, and the central office may need to be advised of the errors by the NIU.

Unfortunately, many of the presently available apparatus and methods for transmitting perturbance monitoring information from the NIU to the central office require using part of the available bandwidth, which would otherwise be available for carrying payload. Thus, part of the payload between the customer's equipment and the central office is, in effect, displaced by the data from the NIU advising the central office of performance information. Since cable is an expensive capital investment, however, such displacement should be minimized.

In addition, the central office may wish to send a signal to the NIU to inquire about historical performance information. The NIU will then responsively provide the requested data to the central office. Such data requested could include statistics on, for example, the number of seconds of severely corrupted data received by the NIU, the historical number of bipolar violations noted by the NIU, or the time when the last substantial burst of corrupt, or error-ridden, data was received by the NIU. Again, the transmission of a request for information by the central office and the resulting transmission of performance information by the NIU may, in some cases, effectively displace a portion of the cables' payload.

The ability to transmit and receive performance monitoring information between the central office and the NIU in an efficient, nonintrusive, and inexpensive manner is thus important. However, such a system must not substantially interfere with the normal performance of the transmission facility. In addition to thus being out of band, or "phantom," the data link should also not be affected by the passage of low frequency (less than 180 Hz) signals through the network, since these signals might be chosen as a test frequencies over the transmission lines as well as the fact that these frequencies are often used for ringing in the telephone plant. For these reasons, the data link should be robust to these interferences.

Moreover, some "intelligent" line repeaters also include a dead loop feature. In this mode, a break in the transmission line or a disconnection of the customer's equipment from the NIU causes the line repeater or the NIU to "dead loop," such that any signal transmitted from the central office is simply rerouted back to the central office. Accordingly, the central office is advised of the abnormality along the transmission cables. The "dead loop" condition may be released if, for example, the line is corrected or the customer's equipment is reconnected to the NIU. Again, the data link must operate when the lines are restored to a normal, or "cut through," mode of operation.

Furthermore, the NIU may be called upon to power up the customer's channel service units. The dam link must be able to accommodate such requirements of the NIU by the customer's premises equipment.

SUMMARY OF THE INVENTION

In a principal aspect, the present invention relates to a data link and method for the transmission of out-of-band, or phantom, performance monitoring information through existing telecommunications transmission facilities. Presently existing telecommunications transmission facilities include a central office, an NIU, and two pairs of cable between them. The central office transmits data (including payload) to the NIU over one pair of cables and the NIU transmits data (including payload) to the central office over the other pair of cables. The NIU, in turn, may transmit payload to, and receive payload from, the customer premises equipment.

Each pair of cables in the central office is interconnected to a simplex lead (on a transformer coil). Similarly, each pair of cables in the NIU is also interconnected to a simplex lead (on a transformer coil).

The present invention includes a central office interface interconnected between the simplex leads of the central office repeater and a performance monitoring link interconnected between the simplex leads of the network interface unit. The central office interface includes a first modem (normally set to be in the "originate" mode) to facilitate requests, such as for performance data from the NIU, and to receive information, such as the performance data requested from the NIU. A first buffer, such as a transformer, substantially isolates the modem from the central office repeater and the rest of the transmission facilities.

The performance monitoring link includes a second modem (normally set to be in the "Answer" mode) and a second buffer. The second modem may receive the request for information from the first modem or may transmit data to the central office interface regarding the performance characteristics of the NIU. The second buffer, such as a transformer, substantially isolates the second modem from the NIU and the rest of the transmission facilities.

Thus, an object of the present invention is an improved, out-of-band performance monitoring information link using existing telecommunications transmission facilities. Yet another object is a less expensive data link for existing transmission facilities that is "phantom" in that it does not affect, and is substantially unaffected by, the transmission of payload over the transmission facilities.

Yet still another object of the present invention is an improved, phantom data link for a central office and NIU that may use existing transmission facilities without the need for substantial additional equipment or substantial modification of existing equipment. Still another object is a data link that is less expensive to manufacture.

Still a further object of the present invention is a data link in which a central office may more reliably request information from a NIU and wherein the NIU may more reliably provide performance monitoring information to the central office. These and other objects, features, and advantages of the present invention are discussed or apparent in the following detailed description.

BRIEF DESCRIPTION OF THE DRAWING

Preferred embodiments of the present invention are described herein with reference to the drawing wherein:

FIG. 2 is a schematic diagram of the central office interface shown in FIG. 1;

FIG. 3 is a schematic diagram of an alternative central office interface shown in FIG. 1; and FIG. 4 is a schematic diagram of the performance monitoring link shown in FIGURE 1.

DETAILED DESCRIPTION OF THE PREFERRED EMBODIMENTS

Figure 1:
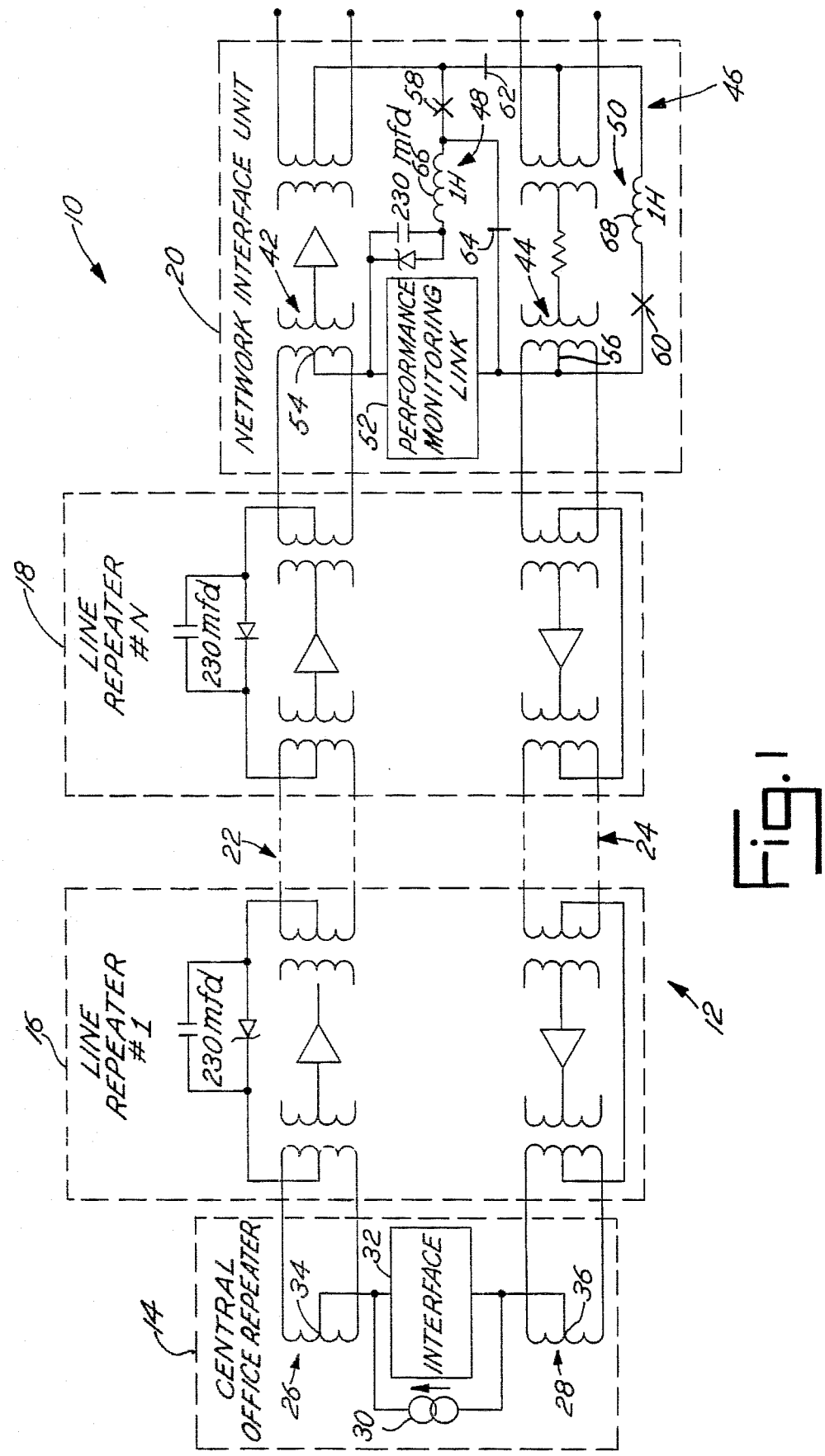
FIG. 1 is a schematic diagram of the preferred embodiment of the present invention.

Referring to FIGS. 1–4, a preferred embodiment of the present invention as shown as a phantom, or out-of-band, dam link 10 for existing telecommunications transmission facilities 12. As shown in FIG. 1, the existing telecommunications transmission facilities 12 include a central office repeater 14, a plurality of line repeaters (designated for illustrative purposes as a first line repeater 16 and an Nth line repeater 18), and a network interface unit ("NIU") 20. The telecommunications transmission facilities 12 also include first and second pairs of exchange grade transmission cables 22, 24 interconnecting the central office repeater 14, line repeaters 16, 18, and NIU 20.

The central office repeater 14 (within the telephone company central office) includes first and second transformers, 26, 28, a direct current source 30, and a central office interface 32. As shown in FIG. 1, each of the transformers 26, 28 includes a simplex lead (or center tap lead) 34, 36 in a coil. Each simplex lead is connected through the coil to one of the pairs of cables 22, 24.

The current source 30 is interconnected between the two simplex leads 34, 36. The current source 30 has a nominal output of approximately 60 milliamps DC. The signal, or "payload," to be transmitted over the cables 22, 24 is superimposed differentially on the 60 milliamp common mode signal provided by the current source 30.

The central office interface 32 is in a parallel configuration with the current source 30. As shown in FIG. 1, it is interconnected between the simplex leads 34, 36 in the central office repeater 14.

The first line repeater 16 is stationed approximately 3,000 feet from the central office repeater 14. The first line repeater 16 recognizes the presence or absence of a pulse from the central office and, when appropriate, regenerates a clean, new pulse, transmitting it to the next line repeater. The next line repeater is again stationed approximately one mile away.

The data to be transmitted over the cables 22, 24, such as speech, are sampled at a rate such as 8,000 hertz, and the amplitude of each signal is measured. The amplitude of each sample is compared to a scale of discrete values and assigned a numeric value. Each discrete value is then coded into a binary form. Representative binary pulses appear on the transmission lines 22, 24.

The binary form of each sampled pulse consists of a combination of seven pulses, or bits. An eighth bit is added to signal the end of the combination, or byte, and to allow for error checking.

Each of the 24 channels in the T1 system is sampled within a 125 microsecond period (equivalent to $\frac{1}{8,000}$ of a second). This period is called a "frame." To each frame, an additional, synchronizing, bit is added in order to signal the end of the frame.

Since there are eight bits per channel and there are 24 channels, and there is one pulse at the end of each frame, the total number of "bits" needs per frame is 193. Thus, the resulting line bit rate for T1 systems is 1.544 million bits per second. The effective bit rate or payload is reduced, however, if one of the channels is "diverted" from carrying payload to carrying performance data.

The "Nth" line repeater 18 transmits its generated signal to the NIU 20 rather than another repeater. The NIU 20 relays the payload to the customer premises equipment.

The NIU 20, like the line repeaters, includes first and second transformers 42, 44. The NIU 20 also includes control circuitry 46, first and second relays 40, 50, and a performance monitoring link 52.

Each of the transformers 42, 44 includes a simplex lead (center tap lead) 54, 56. Each simplex lead is connected through a coil to one of the pairs of cables 22, 24.

Each of the relays 48, 50 includes a normally open switch 58, 60 and a normally closed switch 62, 64 and a nominal 1 henry inductor 66, 68. The inductors 66, 68 substantially block signals having frequencies above 60 hertz and substantially pass signals having a frequencies below 60 hertz.

When the NIU 20 is in the "cut through mode," the relays 48, 50 are in their "normal" condition, and the NIU 20 provides DC simplex current to the customer premises equipment. When the NIU 20 is in the "loop" condition, however the relays 48, 50 are not in their "normal" conditions, and signals from the central office arriving at the NIU 20 over the first pair of cables 22 are routed back to the central office over the second pair of cables 24.

FIG. 2 shows the central office interface 32. The central office interface 32 includes a first modem 70, first transformer 72, and first DC blocking capacitor 74. The first transformer 72 includes first and second coils 76, 78. The first modem 70 is interconnected on either side of the first coil 76. The second coil 78 is AC coupled through the capacitor 74 to the simplex leads 34, 36 in the central office.

The first modem 70 is in the "originate" mode. In originate mode, it may send inquiries to the NIU 20 for performance monitoring information and such information from the NIU 20. The "originate" mode describes which frequencies are used for carriers, not the direction of information flow.

The central office interface 32 is the source and sink of the data link 10 and the termination of the phantom pair. No additional cable or other equipment, other than the central office interface 32 and the performance monitoring link 52, is required to be added to existing transmission equipment 12 in order to effect the exchange of information between the central office repeater 14 and the NIU 20.

An alternative embodiment of the central office interface 32 is shown in FIG. 3. In FIG. 3, an alternative central office interface 79 includes a first modem 80, transformer 82, and capacitor 84, and also a "twin T" filtering network 85. The filtering network 85 is a high Q, notch filter that substantially blocks signals equal to its resonant frequency. This is used, since fixed frequencies such as 20 hertz are sometimes chosen as test frequencies for transmission systems. Induction can also couple 20 Hz or 60 Hz components into the line. Accordingly, it is preferred that the modem 80 not respond to, or be affected by, any low frequency test signal or interference. Such filters may be turned to block virtually any desired frequency from the modem 80.

As is shown in FIG. 4, the performance monitoring link 52 includes a second modem 86, second transformer 88, and second DC blocking capacitor 90. The second transformer 88 includes first and second coils 92, 94. The second modem 86 is interconnected on either side of the first coil 92. The second coil 94 is AC coupled through the capacitor 90 through the simplex leads 54, 56 in the NIU 20.

Like the first modem 70 in the central office, the second modem 86 in the NILI 20 can both source or sink information. It is set to the so called "Answer" mode to be compatible with the central office modem 70. It may send a status report to the central office regarding the receipt of large amounts of, or frequently occurring, corrupt data. Alternatively, the second modem 86 may receive an inquiry from the central office for performance monitoring information and then transfer such information to the central office interface 32.

In operation, the first modem 70 transmits a voltage signal between the simplex leads 34, 36. Notably, the transmission does not depend on what the absolute voltage is between either simplex lead 34, 36 and ground. Only the differential, or relative voltage, is affected by the interface 32.

The performance monitoring link 52 responds to the voltage signal between the simplex leads 54, 56 in the NIU 20 (caused by the voltage signal applied to the simplex leads 34, 36). The performance monitoring link 52 receives relevant data from the NIU control circuitry 46 and transmits the data to the central office by imposing a signal between the simplex leads 54, 56 in the NIU 20. This, in turn, causes a signal between the simplex leads 34, 36, which is detected by the central office interface 32.

The absolute voltage between any of the simplex leads 34, 36, 54, 56 and ground is virtually irrelevant to the function of the data link 10. It is the relative voltage between the simplex leads 34, 36 in the central office and the simplex leads 54, 56 in the NIU 20 that comprises the data signal. The performance of the cable 22, 24 is unaffected by whether or not the data link 10 is transmitting. The data link 10 is thus a "phantom".

Accordingly, with a minimal investment for additional equipment, the exchange of performance data can occur between the central office and the NIU 20, without sacrificing any of the bandwidth on the transmission cable 22, 24. This can result in substantial savings for utilities who wish to use existing equipment for a data link between the central office and the NIU 20 and, at the same time make full use of the implanted cable 22, 24.

Preferred embodiments of the present invention have been described herein. It is to be understood, of course, that changes and modification may be made in the embodiments without departing from the true scope and spirit of the present invention as defined by the amended claims. For example, the preferred embodiment disclosed provides a data link for T1 spans, although the present invention may be used with other types of transmission facilities. Also, while the present invention relates to the transmission and reception of performance information, other data could be transmitted using the present invention. Moreover, whether in originate or answer modes, the invention only requires the consistent use of mating modems.

I claim:

1. In telecommunications transmission facilities, said facilities including a central office, a network interface unit, and two pairs of cables therebetween, said central office transmitting to and receiving from said network interface unit payload data and performance monitoring data over said pairs of cables and including a simplex lead for each of said two pairs of cables, said network interface unit also receiving from and transmitting to said central office payload data and performance monitoring data over said pairs of cable and including a simplex lead for each of said two pairs of cables, and a data link, comprising, in combination:

a central office interface, interconnected between said simplex leads in said central office, for sending and receiving payload data and performance monitoring data; and a performance monitoring link, interconnected between said simplex leads in said network interface unit, for sending, simultaneously, payload data and performance monitoring data to said central office interface.

2. A data link as claimed in claim 1 wherein said central office interface includes first modem means for sending and receiving data and first buffer means for transmitting signals between said first modem means and said simplex leads in said central office and said performance monitoring link includes second modem means for receiving and sending data and second buffer means for transmitting signals between said second modem means and said simplex leads in said performance monitoring link or a predetermined frequency.

3. A data link as claimed in claim 2 wherein said first and second buffers each comprises a transformer.

4. A data link as claimed in claim 3 wherein said central office interface further includes a filtering network to block low frequency interferences from said first modem means.

5. A data link as claimed in claim 3 wherein said central office interface further includes a filtering network to block low frequency interferences from said modem means.

6. A data link as claimed in claim 5 wherein said predetermined frequency is substantially higher than said low frequency interferences.

7. A data link as claimed in claim 3 wherein each of said transformers include two coils and said first and second buffers each further include a blocking capacitor in series with one of said coils.

8. A data link as claimed in claim 2 wherein said facilities further include a plurality of line repeaters, between said central office and said network interface unit, for relaying signals between said central office and said network interface unit.

9. A data link as claimed in claim 8 wherein said central office further includes a current source between said simplex leads.

10. A data link as claimed in claim 9 wherein said network interface unit further includes a plurality of relays to switch said network interface unit between a loop mode of operation and a cut through mode of operation.

11. A method of transmitting and receiving data alone telecommunication facilities, wherein said transmission facilities include a central office, a network interface unit, and two pairs of transmission cables there between, each of said pairs of cables being interconnected in said central office to a simplex lead and each of said pairs of cables being connected in said network interface and to a simplex lead, the method comprising the steps of:

applying a central office performance test signal between said simplex lead in said central office; and detecting said central office performance test signal between said simplex leads in said network interface unit;

wherein said central office performance test signal is applied at said central office and detected on said simplex leads at said network interface unit imultaneously with the transmission of payload data.

12. A method as claimed in claim 11 further comprising, upon detecting said central office performance test signal between simplex leads in said network interface unit, the steps of:

applying a performance data signal, representing performance monitoring data, between said simplex leads in said network interface unit; and detecting said performance data signal between said simplex leads in said central office.

13. A data link as claimed in claim 1 wherein performance monitoring inquiries are sent on said pairs of cables from said central office to said network interface unit substantially simultaneously with sending payload data on said pairs of cables from said central office to said network interface unit.

14. A data link as claimed in claim 13 wherein said payload data is transmitted along a cable of limited bandwidth, further wherein said bandwidth is substantially unaffected by transmission of said performance monitoring data and inquiries.

15. A data link as claimed in claim 1 wherein substantially simultaneous transmission of said payload data and performance monitoring data is substantially non-interfering with the transmission of said payload data and said performance monitoring data.

16. A data link as claimed in claim 13, wherein substantially simultaneous transmission of said payload data and performance monitoring data and inquiries is substantially non-interfering with transmission of said payload data and is substantially non-interfering with transmission of said performance monitoring data and inquiries.

17. A data link as claimed in claim 1 wherein said payload data is transmitted along a cable of limited bandwidth, further wherein said bandwidth is substantially unaffected by transmission of said performance monitoring data.

18. In telecommunications transmission facilities, said facilities including a central office, a network interface unit, and two pairs of cables therebetween, said central office transmitting to and receiving from said network interface unit payload data and performance monitoring data over said pairs of cables and including a simplex lead for each of said two pairs of cables, said network interface unit also receiving from and transmitting to said central office payload data and performance monitoring data over said pairs of cable and including a simplex lead for each of said two pairs of cables, and a data link, comprising, in combination:

a central office interface, interconnected between said simplex leads in said central office, for sending and receiving payload data and performance monitoring data; and a performance monitoring link, interconnected between said simplex leads in said network interface unit, for receiving, simultaneously, payload data and performance monitoring inquiries from said central office interface.

* * * * *